(12) United States Patent
Schifter (10) Patent No.: US 11,284,657 B2
(45) Date of Patent: Mar. 29, 2022

(54) ROTATION BASED WEARABLE SECURING SYSTEM

(71) Applicant: Cory Schifter, Morganville, NJ (US)

(72) Inventor: Cory Schifter, Morganville, NJ (US)

( * ) Notice: Subject to any disclaimer, the term of this patent is extended or adjusted under 35 U.S.C. 154(b) by 0 days.

(21) Appl. No.: 16/554,367

(22) Filed: Aug. 28, 2019

(65) Prior Publication Data

US 2020/0068969 A1 Mar. 5, 2020

Related U.S. Application Data

(60) Provisional application No. 62/723,884, filed on Aug. 28, 2018.

(51) Int. Cl.
| | | |
|---|---|---|
| *A45F 5/02* | (2006.01) | |
| *A41D 27/20* | (2006.01) | |
| *A41F 9/00* | (2006.01) | |
| *G07C 9/00* | (2020.01) | |
| *E05B 73/00* | (2006.01) | |

(52) U.S. Cl.
CPC .............. *A41D 27/205* (2013.01); *A41F 9/00* (2013.01); *A45F 5/021* (2013.01); *E05B 73/00* (2013.01); *G07C 9/00563* (2013.01); *A45F 2005/025* (2013.01); *A45F 2200/0516* (2013.01)

(58) Field of Classification Search
CPC ....... A45C 13/18; A45C 13/185; E05B 73/00; E05B 65/48; E05B 65/50; E05B 65/52; E05B 65/5284; Y10S 224/93; A45F 2005/025; A45F 5/021; A45F 2200/0516

USPC ................... 224/587, 197, 199, 931
See application file for complete search history.

(56) References Cited

U.S. PATENT DOCUMENTS

| | | | | |
|---|---|---|---|---|
| 2,999,621 | A | * | 9/1961 | Kiser .................... A01K 97/06 224/199 |
| 4,139,139 | A | | 2/1979 | Hiraoka et al. |
| 4,209,117 | A | * | 6/1980 | Corinaldi ............. A44B 11/005 206/37 |
| 5,586,706 | A | | 12/1996 | Ritzenhein |
| 5,908,037 | A | * | 6/1999 | Pierson ................ A45D 33/006 132/293 |

(Continued)

FOREIGN PATENT DOCUMENTS

| | | |
|---|---|---|
| CN | 201278814 Y | 7/2009 |
| CN | 206289359 U | 6/2017 |

*Primary Examiner* — Adam J Waggenspack
(74) *Attorney, Agent, or Firm* — Gearhart Law LLC (57) ABSTRACT

A rotation based wearable securing system includes a cover attached to an open ended container. The container is secured to a wearable article and encloses a mobile device. A provided locking mechanism is capable of locking the cover to the container. In response to an orientation change associated with the container in relation to the wearable article, the locking mechanism locks or unlocks the cover to the container and secures or releases the mobile device within the container. Furthermore, the mobile device is secured to the wearable article by fastening a lockable component (connected to the mobile device) to a receiving component (attached to the wearable article). The locking mechanism is capable of securing or releasing the mobile device to or from the wearable article by locking or unlocking the lockable component to or from the receiving component in response to an orientation change.

8 Claims, 5 Drawing Sheets

(56) References Cited

U.S. PATENT DOCUMENTS

| | | | | |
|---|---|---|---|---|
| 6,279,362 | B1 * | 8/2001 | Lee | A44B 15/00 |
| | | | | 70/456 R |
| 8,584,916 | B1 * | 11/2013 | Chen | A45F 5/021 |
| | | | | 224/199 |
| 2003/0071096 | A1 * | 4/2003 | Berdan | A63B 57/207 |
| | | | | 224/199 |
| 2008/0149678 | A1 * | 6/2008 | Huang | B25H 3/003 |
| | | | | 224/666 |
| 2013/0325648 | A1 | 12/2013 | Kanner | |
| 2016/0066637 | A1 | 3/2016 | Kim | |
| 2016/0120251 | A1 | 5/2016 | Grafenstein-Kinzel et al. | |
| 2017/0280862 | A1 | 10/2017 | Blackwood | |
| 2019/0377857 | A1 * | 12/2019 | Bateman | E05B 45/06 |
| 2020/0093237 | A1 * | 3/2020 | Coicou | A45C 13/10 |

* cited by examiner

ROTATION BASED WEARABLE SECURING SYSTEM

CLAIM OF PRIORITY

This U.S. application claims priority of U.S. Provisional Application No. 62/723,884, filed Aug. 28, 2018, the contents of which are herein incorporated by reference in its entirety.

FIELD OF THE EMBODIMENTS

The field of the present invention and its embodiments relate to a rotation based wearable securing system that includes a case based mechanism and an attachable mechanism.

BACKGROUND OF THE EMBODIMENTS

Mobile devices have integrated seamlessly into daily affairs. A modern mobile device, such as a smart phone, integrates features and functionality that were provided by a variety of legacy devices, such as a snap and shoot camera, a personal music player, and a personal digital assistant, among others. Furthermore, advances in technology have packed more features into the modern mobile device in a smaller form factor compared to a legacy device. As such, the mobile device has become an integral part of daily life and an irreplaceable component of daily routines.

Storage of and ease of access to the mobile device is a matter of significance. Legacy solutions attempt to integrate storage of the mobile device with a wearable article of a user such as a pocket, a belt, and/or a strap, among others. However, legacy solutions attempt at simplified access fail at securing the mobile device from unintended access and/or damage. Below examples may include schemes that attempted to store the mobile device in an association with a user.

For instance, CN201278814Y pertains to two types of trousers, and a single-layer outer patch pocket, a double-layer outer patch pocket, a hidden inner patch pocket, a hidden inserted pocket and a hidden waist pocket which are sewn on the trousers, and the hidden waist pocket is sewn in the waist part of the trousers.

U.S. Pat. No. 5,586,706 pertains to a waist bag that has a pouch for carrying small personal items. A hidden pocket in the pouch enhances security.

US 2013/0325648 A1 pertains to a clothing article that has pockets for personal articles such as identification cards and credit cards.

US 2016/0120251 A1 pertains to a belt for the placement and the concealment of items. The belt includes flaps that conceal the inner side and allow for the placement of pockets and storage devices within the concealed area.

US 2017/0280862 A1 pertains to a cell phone holding device that includes a belt that is adjustable in length and has two opposing ends connectable together, the belt sized for surrounding a user's thigh.

Various systems and methodologies are known in the art. However, their structure and means of operation are substantially different from the present disclosure. The other inventions fail to solve all the problems taught by the present disclosure. At least one embodiment of this invention is presented in the drawings below and will be described in more detail herein.

SUMMARY OF THE EMBODIMENTS

The present invention and its embodiments relate to a rotation based wearable securing apparatus that is configured to secure a mobile device to a wearable article such as a belt or a strap. In an example embodiment of the present invention, the rotation based wearable securing apparatus may include a container. The container may be configured to enclose the mobile device. A cover may be attached to the container. A locking mechanism may be coupled to the container and the cover. The locking mechanism may be configured to secure or release the mobile device within the container by locking or unlocking the cover to the container in response to an orientation change associated with the container.

In another embodiment of the present invention, a rotation based wearable securing system is described. The rotation based wearable securing system may include a receiving component secured to a wearable article. The receiving component may include a front section that is connected to a back section with a hinge. The rotation based wearable securing system may also include a lockable component that is attached to a mobile device. The lockable component is configured to fasten to the receiving component. A locking mechanism may lock or unlock the receiving component and the lockable component. The locking mechanism may be configured to receive the lockable component as overlaid on the receiving component. Next, the locking mechanism may detect an orientation change associated with the mobile device (in relation to the wearable article). In response, the locking mechanism may lock or unlock the lockable component to the receiving component to secure or release the mobile device to or from the wearable article.

In yet another embodiment of the present invention, a method of securing a mobile device with a rotation based wearable securing system is described. In an example scenario, a container may receive a mobile device. The container may be secured to a wearable article with a clasp. A cover may be attached to the container. Next, a user action rotating the container may be detected. The user action may induce an orientation change associated with the container. The cover may be locked or unlocked from the container to secure or release the mobile device within the container in response to the orientation change.

It is an object of the present invention to provide a rotation based wearable securing system that secures a mobile device to a wearable article.

It is an object of the present invention to provide a rotation based wearable securing system that locks or unlocks a cover to a container based on an orientation change associated with the container.

It is an object of the present invention to provide a rotation based wearable securing system that rotates to lock or unlock the cover to the container based on a user input.

It is an object of the present invention to provide a rotation based wearable securing system that authenticates the user with biometric input prior to locking or unlocking the cover from the container.

It is an object of the present invent to provide a rotation based wearable securing system that includes a receiving component attached to a wearable article and a lockable component attached to a mobile device.

It is an object of the present invention to provide a rotation based wearable securing system that secures the mobile device to the wearable article by locking the receiving component to the lockable component through a rotation.

DESCRIPTION OF THE PREFERRED EMBODIMENTS

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Figure 1:
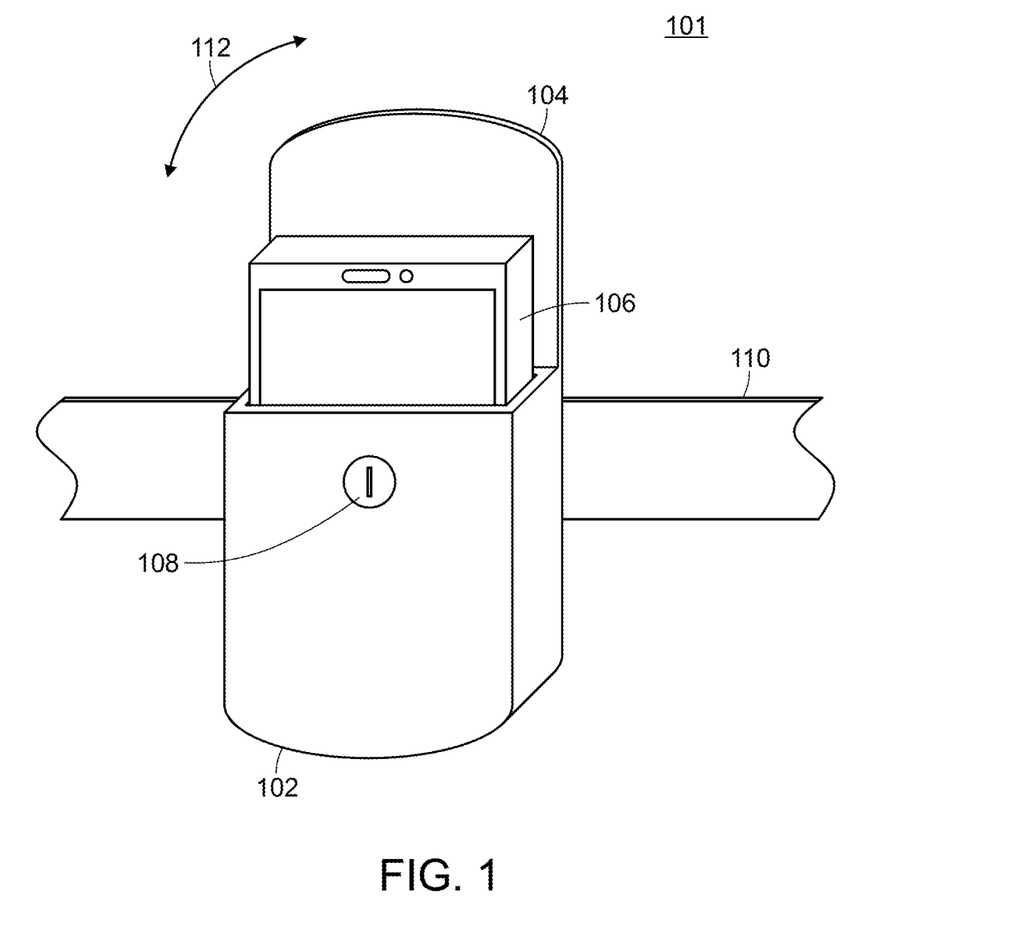
FIG. 1 shows a front view of an embodiment of the present invention.

FIG. 1 shows a rotation based wearable securing system 101 (or apparatus). The rotation based wearable securing system 101 may be used to secure a mobile device 106 or other object to a wearable article 110 such as a belt or a strap. Alternatively, the wearable article 110 may also be a component of a portable item such as a bag, a backpack, or a purse, among others. Furthermore, the rotation based wearable securing system 101 may include two primary components, a container 102 and a cover 104. The container 102 may be secured to the wearable article 110 through an integrated clasp that is attached to the wearable article 110. The container 104 may also have an open end through which the mobile device 106 may be inserted into the container 102. The cover 104 may be attached to the container 102 through a hinge or other mechanism.

In an example scenario, the mobile device 106 may be secured within the container 102 by overlaying the cover 104 over the open end and locking the cover 104 to the container 102. The cover 104 may be locked to the container through a locking mechanism 108. The locking mechanism 108 may provide lock/unlock functionality through a hinge and a clasp, or through a magnet based scheme, among other scenarios. The locking mechanism 108 may also include circuitry and instructions to execute and manage operations associated with securing or releasing the mobile device. The operations associated with the locking mechanism 108 may be depended on an orientation change 112 associated with the container 102.

For example, the cover 104 may be unlocked from the container 102 when the container is in a vertical orientation compared to the wearable article 110. A user may induce the orientation change 112 by rotating the container 102 from the vertical orientation to a horizontal orientation. An example of the user may include a wearer of the wearable article 110. The user may manually overlay the cover 104 over the container 102 during the orientation change 112. Alternatively, the cover 104 may automatically be overlaid over the container 102 during the orientation change 112 by an automated mechanism (such a spring based action, among others).

The locking mechanism 108 may lock the cover 104 to the container 102 based on the orientation change 112. As a result, the mobile device 106 may be secured within the container 102. Securing the mobile device 106 within the container 102 may prevent unintended fall, loss, and/or damage to the mobile device 106.

Alternatively, the user may unlock the cover 104 from the container 102 by rotating the container 102 to induce the orientation change 112. For example, the user may rotate the container 102 from a horizontal orientation (in relation to the wearable article 110) to a vertical orientation. As a result, the locking mechanism 108 may unlock the cover 104 from the container 102 based on the orientation change 112. As such, the mobile device 106 may be released from the container 102. Additionally, the mobile device 106 may be made accessible to the user.

Figure 2A:
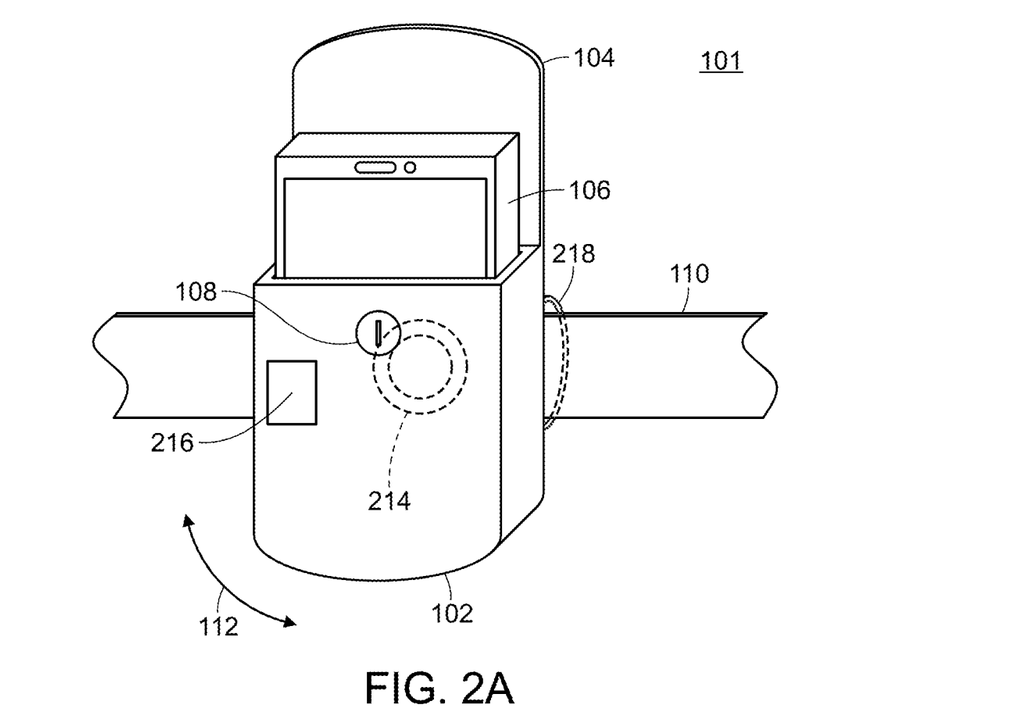
FIG. 2A shows an unlocked view of an embodiment of the present invention.

FIG. 2A shows an unlocked view of the rotation based wearable securing system 101. In an example scenario, the container 102 may be secured to the wearable article 110 through a clasp 218 attached to the container 102. A user may attach the rotation based wearable securing system 101 to the wearable article 110 using the clasp 218. The clasp 218 may be also have component(s) and feature(s) that may prevent accidental removal from the attached wearable article such as the wearable article 110. An example may include a mechanism to lock the clasp 218 to the wearable article 110.

The container 102 may include a motor 214 to aid in automated lock and unlock operations associated with the cover 104 and the container 102. For example, a sensor 216 may be integrated to the container 102 to capture a user input. The user input may trigger the locking mechanism 108 to activate the motor 214. The motor 214 may rotate to induce the orientation change 112.

In response to the orientation change 112, the locking mechanism 108 may lock the cover 104 to the container 102 to secure the mobile device. An example of the orientation change 112 may include a rotation of the container 102 from a vertical orientation to a horizontal orientation to lock the two components. The user may manually overlay the cover 104 over the container 102 to enable the locking mechanism 108 to lock the two components. Furthermore, the locking mechanism 108 may lock the cover 104 to the container 102 at a beginning of the orientation change 112. Locking the two components at the beginning of the orientation change 112 may prevent the mobile device 106 from falling out of the container 102 during the orientation change 112.

Alternatively, an automated mechanism (such as an actuator or a spring loaded mechanism) may overlay the cover 104 onto the container 102 to enable the locking mechanism 108 to lock the two components during the orientation change 112. Additionally, the locking mechanism 108 may prevent damage to the mobile device 106 by stopping the orientation change 112 when the cover 104 is detected as away (or unlocked) from the container 102. For example, the locking mechanism 108 may stop the motor 214 from completing the orientation change 112. Alternatively, the locking mechanism 108 may lock the container 102 in place and prevent the user from manually implementing the orientation change 112.

Figure 2B:
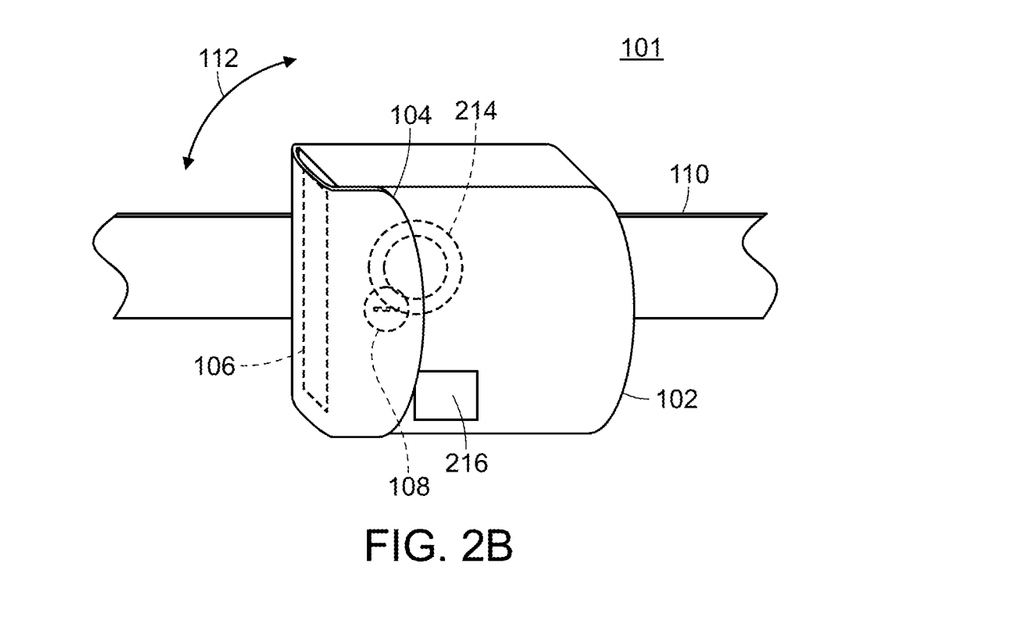
FIG. 2B shows a locked view of an embodiment of the present invention.

FIG. 2B shows a locked view of the rotation based wearable securing system 101. In an example scenario, the cover 104 may be locked to the container 102. The mobile device 106 may be secured within the container 102. A rotation of the container 102 (provided manually by the user or automatically by the motor 114) may generate the orientation change 112 associated with the container 102. The orientation change 112 may induce the locking mechanism 108 to unlock the cover 104 from the container 102. As a result, the mobile device 106 may be released and accessible to the user.

For example, the user may manually rotate the container 102 from a horizontal orientation (locked state) to a vertical orientation (unlocked state) in relation to the wearable article 110 (attached to the container 102). In response, the locking mechanism 108 may unlock the cover 104 from the container 102. The two components may be unlocked at an end of the orientation change 112 to prevent the mobile device 106 from accidentally falling out of the container 102.

Alternatively, the user may provide an input through the sensor 216 to initiate an automated unlock operation. While in the locked state, the locking mechanism 108 may interpret the input as a request to unlock the cover 104. In response, the motor 214 may be prompted to rotate the container 102. The rotation may induce the orientation change 112 from the horizontal orientation to the vertical orientation. Next, the cover 104 may be unlocked from the container 102.

Figure 3:
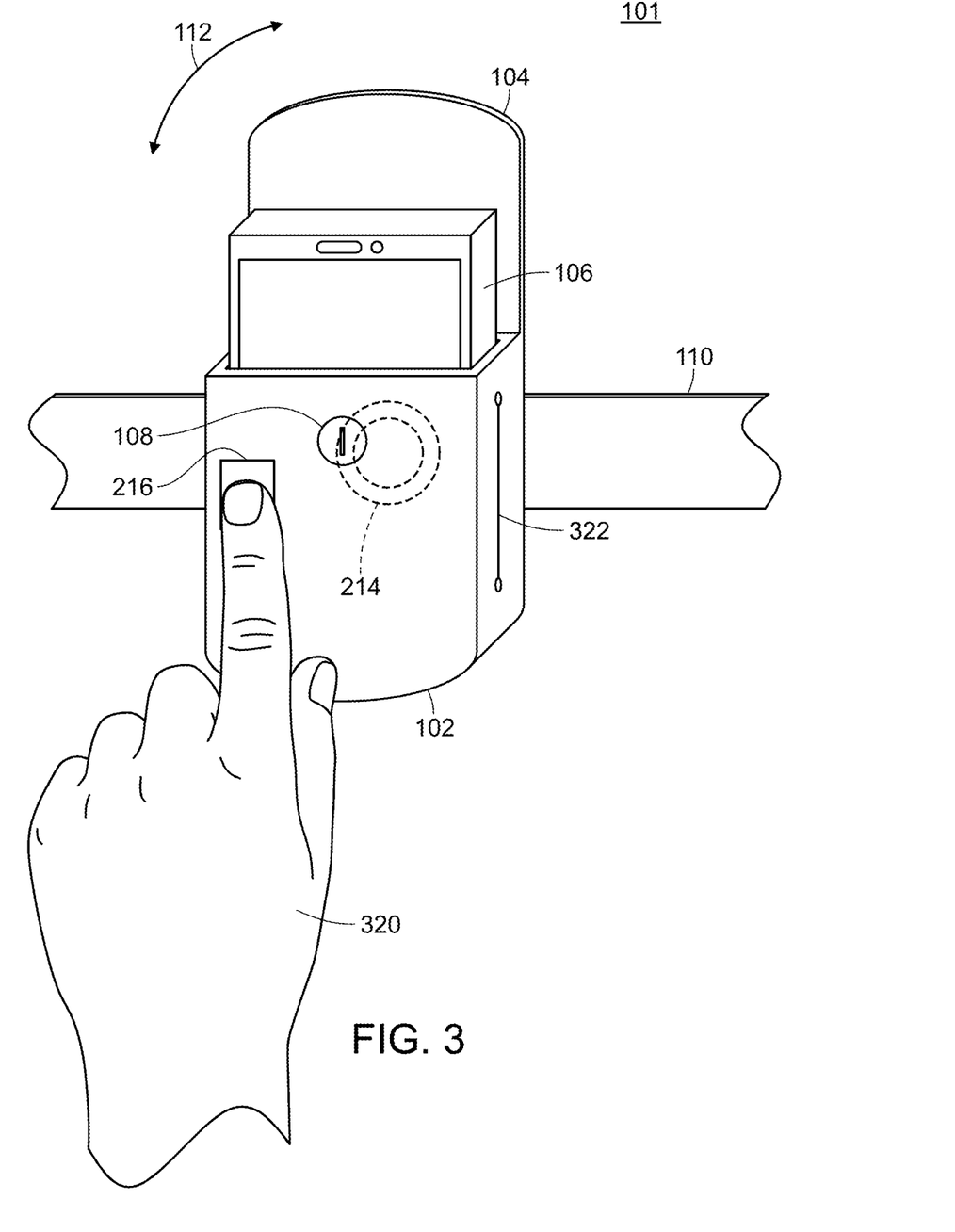
FIG. 3 shows another view of an embodiment of the present invention.

FIG. 3 shows another view of the rotation based wearable securing system 101. A user may engage the locking mechanism 108 to lock/unlock the cover 104 to/from the container 102 by providing a user input 320 to the sensor 216. In an example scenario, the sensor 216 may include a finger print reader. The user input 320 may include a user action to provide a finger print on the finger print reader. In response to receiving the user input 320, the locking mechanism 108 may authenticate the user input 320 (such as the finger print). Upon authentication, the locking mechanism 108 may continue with locking/unlocking the cover 104 from the container 102. The locking or unlocking operations may be initiated manually by the user through a rotation action to induce the orientation change 112. Alternatively, the locking or unlocking operations may be accomplished automatically when the motor 214 is instructed to provide the orientation change 112 by rotating the container 102.

The locking mechanism 108 may also automatically keep the mobile device 106 within the container 102 when the cover 104 is not locked to the container 102. For example, the locking mechanism may instruct the motor 214 to rotate the container 102 to maintain a vertical orientation in relation to a direction of gravity. The vertical orientation may prevent the mobile device 106 from falling out of the container 102 which may prevent loss or damage to the mobile device 106. The vertical orientation may keep a closed bottom section of the container 102 pointed toward the direction of gravity and an open end of the container pointed away from the direction of gravity.

The container 102 may also integrate an antenna extender 322. The antenna extender may fasten to an antenna component of the mobile device 106 when the mobile device 106 is inserted into the container 102. The antenna extender 322 may provide an extended transmission range for wireless emissions transmitted by the mobile device 106.

Figure 4A:
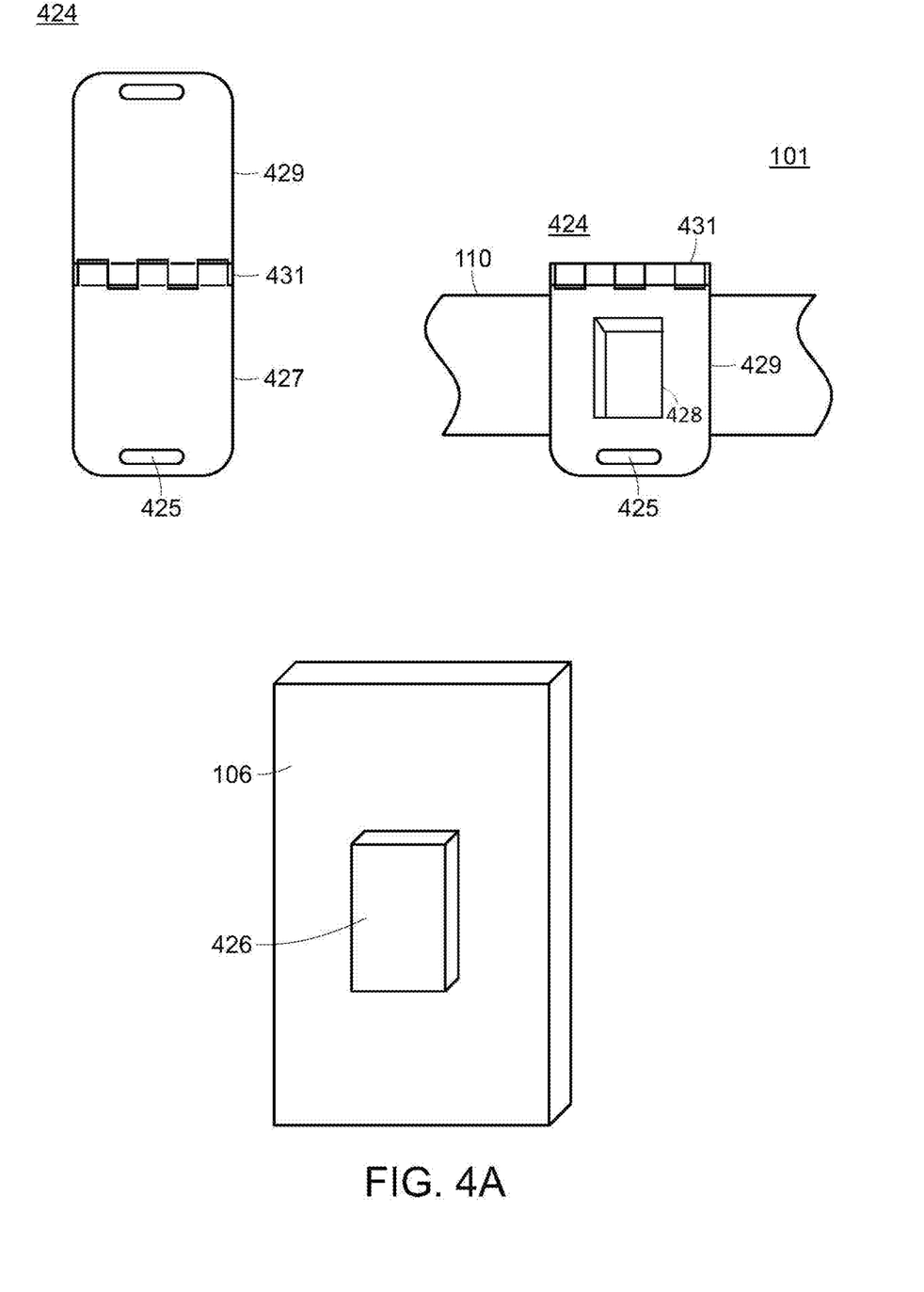
FIG. 4A shows a component view of an embodiment of the present invention.

FIG. 4A shows a component view of the rotation based wearable securing system 101. In an example scenario, the rotation based wearable securing system 101 may include a receiving component 424 and a lockable component 426. The receiving component 424 may be integrated to a wearable article 110 (such as a belt, or a strap, among others). The receiving component 424 may include a back section 427 connected to a front section 429 with a hinge 431. The two sections may be secured or released from each other through a fastener 425.

For example, the receiving component 424 may be secured on the wearable article 110 by inserting the back section 427 behind the wearable article 110. Next, the front section 429 may be rotated (centered on the hinge 431) to overlay the front section 429 on the wearable article 110. The front section 429 may be locked to the back section 427 with the fastener 425 to secure the receiving component 424 on the wearable article 110.

The front section 429 of the receiving component 424 may have structures to allow for attaching the receiving component 424 to the lockable component 426. For example, the front section 429 may have an indentation 428 to allow the lockable component 426 to snap and/or slide on the receiving component 424. The indentation 428 may have a shape that complements the shape of the lockable component 426. Furthermore, the lockable component 426 may be permanently or temporarily attached to the mobile device 106 to enable securing of the mobile device 426. The lockable component 426 may also be attached to a case enclosing the mobile device 106. Alternatively, the lockable component 426 may be a part of the outer casing of the mobile device 106.

Figure 4B:
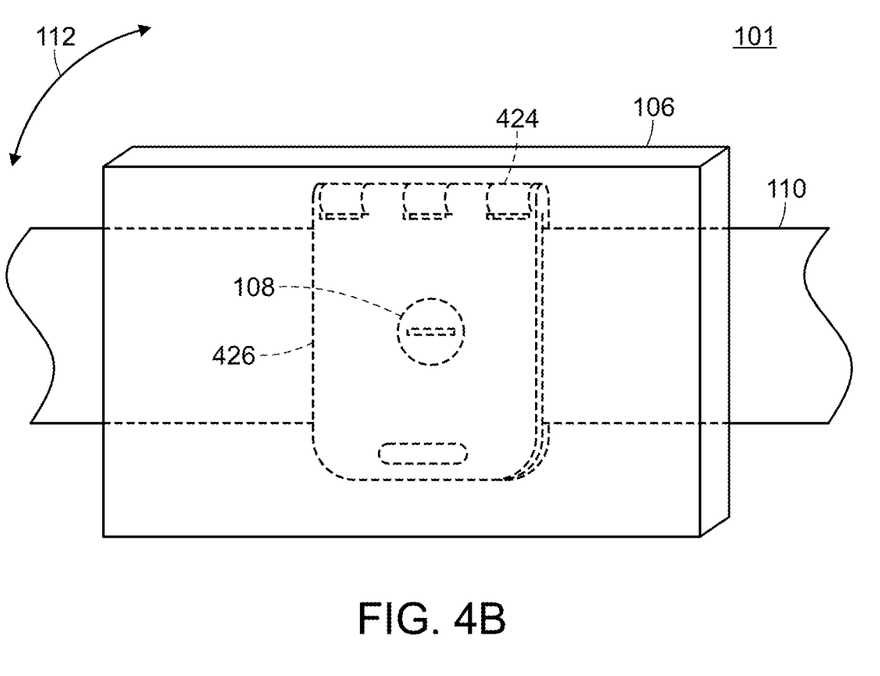
FIG. 4B shows an interlocked view of an embodiment of the present invention.

FIG. 4B shows an interlocked view of the rotation based wearable securing system 101. In an example scenario, the mobile device 106 may be secured to the wearable article 110 in response to a user action that induces the orientation change 112. For example, a user may attach the mobile device 106 to the wearable article 110 by inserting (or overlaying) the lockable component 426 to the receiving component 424. As a result, the mobile device 106 may be attached to the wearable article 110 but not secured to the wearable article 110. To prevent accidental removal and/or damage to the mobile device 106 (among other reasons), the user may desire to secure the mobile device 106 to the wearable article 110.

To secure the mobile device 106, the user may start rotating the mobile device 106 from a vertical orientation to a horizontal orientation in relation to the wearable article 110. The locking mechanism 108 may detect the orientation change 112 and lock the lockable component 426 to the receiving component 424. As a result of the locking operation, the mobile device 106 may be secured to the wearable article 110 and may not be accidentally or intentionally removed from the wearable article 110. In an example scenario, the locking mechanism 108 may lock the locking component 426 to the receiving component 424 immediately after a start of the orientation change 112 to prevent accidental slippage of the mobile device 106 during the orientation change 112.

The locking mechanism 108 may be composed of structures integrated to the front section 429 of the receiving component 424. The locking mechanism 110 may provide the functionality and operations to execute the orientation change to lock/unlock the locking component 426 to/from the receiving component 424.

The locking mechanism 108 may also unlock the lockable component 426 from the receiving component 424 upon detecting the orientation change 112. The orientation change 112 may be from a horizontal orientation to a vertical orientation of the mobile device 106 in relation to the wearable article 110. The locking mechanism 108 may unlock the two components towards a completion of the orientation change 112 to prevent accidental slippage of the mobile device 106 during the orientation change 112.

Upon unlocking the two components, the mobile device 106 may be released from the wearable article 110. However, the mobile device 106 may still be resting on the wearable article 110 because the lockable component 426 may still be overlaid on the receiving component 424. The mobile device 106 may not be removed from the wearable article 110 until further action by the user.

The orientation change 112 may be manually completed by the user. Alternatively, the operations to complete the orientation change 112 may be automated. A mechanism to automate the orientation change 112 may include a motor mounted on the front section 429 of the receiving component 424. The motor may rotate the mobile device 106 to induce the orientation change 112 in response to an input by the user, and/or a timer based mechanism, among other schemes.

A method of securing a mobile device with a rotation based wearable securing system is described. In an example scenario, a container may receive a mobile device. The container may be secured to a wearable article. A cover may be attached to the container. Next, a user action rotating the container may be detected. The user action may induce an orientation change associated with the container. The cover may be locked or unlocked from the container to secure or release the mobile device within the container in response to the orientation change.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A rotation based wearable securing apparatus comprising:
    a container, including a belt clip shaped clasp that is configured to attach to a wearable article, wherein the container is configured to enclose a mobile device;
    a cover attached to the container; and
    a locking mechanism coupled to the container and the cover including a circuit configured to lock and unlock the locking mechanism, wherein the circuit is configured to secure or release the mobile device within the container by locking or unlocking the locking mechanism, thereby securing or releasing the cover to the container in response to a rotation of the container around an axis through the container and wearable article.

2. The apparatus of claim 1, wherein the locking mechanism is configured to:
    detect the orientation change from a vertical orientation to a horizontal orientation;
    lock the cover to the container in response to the rotation of the container around the axis through the container and wearable article; and
    secure the mobile device within the container.

3. The apparatus of claim 1, wherein the locking mechanism is configured to:
    detect the orientation change from a horizontal orientation to a vertical orientation;
    and unlock the cover from the container in response to the rotation of the container around the axis through the container and wearable article.

4. The apparatus of claim 1, further comprising:
    a motor coupled to the locking mechanism, wherein the motor is configured to rotate the container.

5. The apparatus of claim 4, wherein the locking mechanism is further configured to:
    detect a user input to lock or unlock the cover to the container;
    rotate the container to induce the orientation change; and
    secure or release the cover to the container based on the user input.

6. The apparatus of claim 5, wherein the user input includes a biometric input.

7. The apparatus of claim 6, wherein the locking mechanism is further configured to:
    authenticate the biometric input prior to rotating the container to induce the orientation change.

8. The apparatus of claim 4, herein the locking mechanism is further configured to:
    detect the mobile device within the container;
    identify the cover as unlocked from the container; and
    automatically rotate the container to maintain a vertical orientation of the container in relation to a direction of gravity to prevent the mobile device from falling out of the container.

* * * * *